(12) United States Patent
Hudson (10) Patent No.: US 7,313,549 B2
(45) Date of Patent: Dec. 25, 2007

(54) REMOTE MATERIALS MANAGEMENT SYSTEM

(76) Inventor: Frederick J. Hudson, 1147 Saint Finegan Dr., West Chester, PA (US) 19382

( * ) Notice: Subject to any disclaimer, the term of this patent is extended or adjusted under 35 U.S.C. 154(b) by 127 days.

(21) Appl. No.: 10/074,237

(22) Filed: Feb. 12, 2002

(65) Prior Publication Data

US 2003/0130964 A1 Jul. 10, 2003

Related U.S. Application Data

(60) Provisional application No. 60/347,261, filed on Jan. 9, 2002.

(51) Int. Cl.
  *G06F 17/00* (2006.01)
  *G06F 19/00* (2006.01)
  *G06Q 99/00* (2006.01)
  *G06K 15/00* (2006.01)
  *G06B 15/02* (2006.01)
(52) U.S. Cl. .................... 705/404; 705/1; 235/385; 235/383; 235/384
(58) Field of Classification Search .............. 705/1, 705/7–9, 11, 28, 29, 500, 404; 707/1, 100; 235/462.01, 383–385; 700/213–215
See application file for complete search history.

(56) References Cited

U.S. PATENT DOCUMENTS 5,038,283 A 8/1991 Caveney et al.

(Continued)

FOREIGN PATENT DOCUMENTS

EP 0203687 12/1986

(Continued)

OTHER PUBLICATIONS

EP Warehouse Inventory Automated Processing Software; the Internet printout; 1998; 4 pages.*

(Continued)

*Primary Examiner*—Igor N. Borissov (57) ABSTRACT

A materials management system, and a method of controlling a materials management flow including at least one inventoried item, are disclosed. The materials management system may include a remote operation center that provides a coordination of at least one portion of the materials management system, and that receives at least one attribute of at least one material flow item in the at least one portion of the materials management system, and at least one receiving station that transmits the at least one attribute to the remote operation center, and that receives the at least one update attribute from the remote operation center, over an external interconnection. The method includes the steps of scanning the at least one inventoried item upon entry into the materials management system at a first local receiving station, scanning the at least one inventoried item at an at least one secondary receiving station prior to delivery of the item, scanning the at least one inventoried item at at least one tertiary receiving station upon delivery of the item, scanning the at least one least one tertiary receiving station upon delivery of the item, and reconciling placement of the item at at least one of the at least one secondary receiving station and the at least one tertiary receiving station at a remote operation center externally connected to the first local receiving station, the at least one secondary receiving station, and the at least one tertiary receiving station.

4 Claims, 11 Drawing Sheets

U.S. PATENT DOCUMENTS

| | | | |
|---|---|---|---|
| 5,291,397 A * | 3/1994 | Powell | 705/28 |
| 5,671,362 A * | 9/1997 | Cowe et al. | 705/28 |
| 5,920,261 A | 7/1999 | Hughes et al. | |
| 5,930,156 A * | 7/1999 | Kennedy | 705/8 |
| 6,144,955 A * | 11/2000 | Tsuiki et al. | 707/1 |
| 6,148,239 A * | 11/2000 | Funk et al. | 700/1 |
| 6,185,198 B1 | 2/2001 | LaDue | 370/329 |
| 6,211,710 B1 * | 4/2001 | Madhu et al. | 327/198 |
| 6,335,685 B1 | 1/2002 | Schrott et al. | |
| 6,563,417 B1 * | 5/2003 | Shaw | 340/10.1 |
| 6,622,127 B1 * | 9/2003 | Klots et al. | 705/28 |
| 6,883,710 B2 * | 4/2005 | Chung | 235/385 |
| 2002/0123814 A1 * | 9/2002 | Bickley et al. | 700/99 |
| 2002/0161593 A1 * | 10/2002 | Williams et al. | 705/1 |
| 2003/0158795 A1 * | 8/2003 | Markham et al. | 705/28 |

FOREIGN PATENT DOCUMENTS

| | | | |
|---|---|---|---|
| GB | 2251241 A * | 7/1992 | |
| WO | WO 96/29578 | 9/1996 | |
| WO | WO 97/08628 | 3/1997 | |
| WO | WO 99/38136 | 7/1999 | |

OTHER PUBLICATIONS

1999 RFID Industry News Archive; 1999; 7 pages.*

* cited by examiner

Search

Reports

Package Operations:

- Package Information Screen
- Hand-Off to Distribution
- Load Packages on Truck
- Package Delivery
- Hand-Off to Third Party
- Manifest Report
- Server Timestamp

Administration

WebTrack Home

FIG-4a

Receive package:

| | |
|---|---|
| Station: | |
| Receiving Station: | |
| Receive Date: | |
| Receive Time: | |
| Purchase Order: | |
| Site: | Test Site (Testing Only) |
| Building: | |
| Room: | |
| Vendor: | |
| Carrier: | UPS |
| Tracking Number: | |
| Consignee Last | |
| Consignee 1st Initial: | |
| Piece Quantity: | |
| Perishable: | ☐ |
| Priority: | ☐ |
| Comments: | |
| Package ID: | |

[Submit]

FIG 4b

Please scan a pallet or package:

Scan Package:
Station:
Pallet/Package

FIG 4c

Scan truck:

Station: [        ]

TruckNumber: [    ]

FIG 4d

Enter delivery information:

Station: ☐

Package Or Pallet ☐

FIG 4e

Third party hand-off:

Station: 
Comments: 
Hand Off Type: Customer PickUp
Scan Package or Pallet:

[Submit]

FIG 4f

Search Results:

| THG Tracking Number | Carrier Tracking Number | Purchase Order | Vendor | Last Name | First Initial | Status | Date |
|---|---|---|---|---|---|---|---|
| P46613 | | | | | | In Distribution | 11/21/2001 11:31 |

Select search criteria:

THG Tracking No.: [p0046613]

Carrier Tracking No.(*): [ ]

Purchase Order No.: [ ]

Consignee Last Name: [ ]

Last name matching: ⊙ Begins   ○ Contains   ○ Exact match

First Initial: [ ]

Site: [None selected]

Building: [ ]

Vendor: [ ]

Status: [Any Status]

Date   From: [    ]  To: [    ]  (MM/DD/YYYY)

Limit search results to the first [50] matches.

[Search]  [Clear Form]

About package searching || WebTrack Home

*(*) Partial match for Carrier No. enabled*

FIG 4g

Package p0046613 is not on file.

Package History:

| DATE | STATION | ACTION | COMMENTS |
|---|---|---|---|
| 11/21/2001 11:31 | 1a | Handed off to distribution. | |
| 11/21/2001 11:37 | 1a | Package Handed off to third party (Customer | |

Lookup package:

Package ID: p0046613

WebTrack Home

FIG. 4h

REMOTE MATERIALS MANAGEMENT SYSTEM

CROSS REFERENCE TO RELATED APPLICATIONS

This application claims the benefit of U.S. Provisional Application Ser. No. 60/347,261 of inventor Frederick J. Hudson entitled "THG Webtrack Logistics System" filed on Jan. 9, 2002.

STATEMENT REGARDING FEDERALLY SPONSORED RESEARCH OR DEVELOPMENT

Not Applicable.

BACKGROUND OF THE INVENTION

1. Field of the Invention

This invention relates primarily to the field of control systems, and, more particularly, to the field of control wherein tracking and reconciliation are desired, and, yet more particularly, to the field of materials management including tracking and reconciliation using an external network.

2. Description of Related Art

Historically, the need has arisen for businesses to control and monitor material flow items from a given point until delivery. This need is present in the business cycle from a time-period just prior to ordering through delivery, receipt, and storage or use. The need for materials management arises from the marketplace, wherein the market participants seek to gain a competitive edge. Also, it is undesirable for businesses to spend time on materials management issues rather than concentrating on core areas of business expertise. In addition, speed and accuracy are important to maintain a competitive advantage. In some situations it is necessary for businesses to evidence a quick response wherein the product being delivered has, for example, a finite lifetime given the conditions present during shipment. In response to this need, among others, materials management systems have been developed. Previous solutions have included, for example, bar coding, and tracking that the bar code has been received at a destination. However, the materials management systems presently employed have historically failed to provide remote coordination and reconciliation of material flow items contained therein, thus evidencing a disadvantage of inefficiency and decreased reliability.

Therefore, the need exists for a materials management system that allows for reconciliation of delivery, and that provides remote access. In response to this need, the present invention provides an efficient, easily interfaced, and modular material flow management system. In addition, reconciliation of the delivery in this materials management system may provide the added benefit of verifying that all items for a given destination have been delivered, or that an item for delivery is delivered to a different destination. This type of reconciliation increases both efficiency and reliability. Efficiency is increased because the need for repeated checking or repeated counting of boxes is negated. Reliability is increased because the system alerts the user of an attempted incorrect delivery, and alternatively may alert to a missed delivery for a given destination.

BRIEF SUMMARY OF THE INVENTION

The present invention includes a materials management system. The materials management system may include a remote operation center that provides coordination of at least one portion of the materials management system, and that receives at least one attribute of at least one material flow item in the at least one portion of the materials management system, and at least one receiving station that transmits the at least one attribute to the remote operation center, and that receives the at least one update attribute from the remote operation center, over an external interconnection. The remote operation center preferably updates the at least one attribute to at least one updated attribute to formulate the coordination within the materials management system. The at least one attribute and the at least one updated attribute are preferably reconciled at the receiving station by the coordination.

The present invention additionally includes a method of controlling a materials management system including at least one material flow item. The method includes the steps of scanning the at least one material flow item upon entry into the materials management system at a first local receiving station, scanning the at least one material flow item at an at least one secondary receiving station prior to delivery of the item, scanning the at least one material flow item at the at least one tertiary receiving station upon delivery of the item, scanning the at least one least one tertiary receiving station upon delivery of the item, and reconciling placement of the item at the at least one of the at least one secondary receiving station and the at least one tertiary receiving station at a remote operation center externally connected to the first local receiving station, the at least one secondary receiving station, and the at least one tertiary receiving station.

The present invention solves a need in the prior art in that it provides a materials management system that allows for reconciliation of delivery with remote access, in an efficient, easily interfaced, and modular materials management system.

BRIEF DESCRIPTION OF THE FIGURES

The invention will become more readily apparent from the following description of preferred embodiments thereof shown, by way of example only, in the accompanying drawings wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical control system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
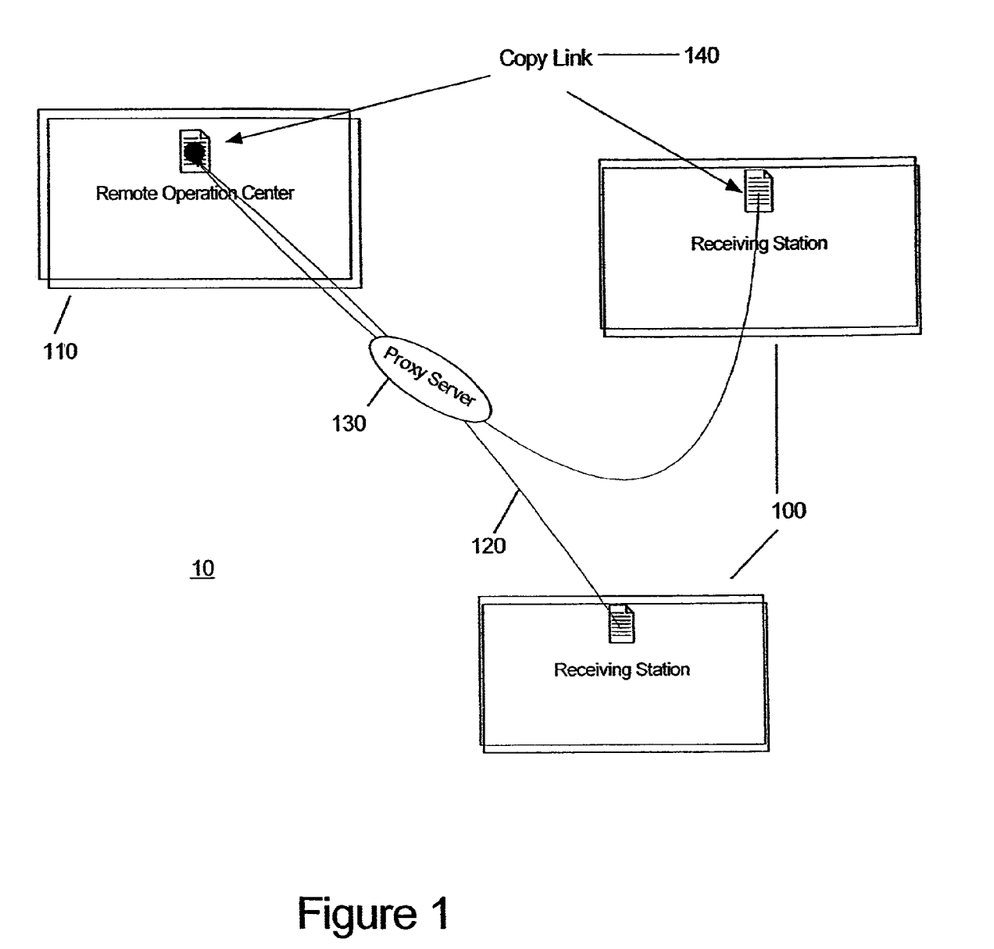
FIG. 1 is a block diagram illustrating a materials management system in accordance with the present invention.

FIG. 1 is a block diagram illustrating a materials management system 10 in accordance with the present invention. The system of the present invention is employed to track at least one item, or package, through the materials management system process of a local site associated with at least one receiving station 100. The system 10 includes at least two receiving stations 100, a remote operation center 110, and an external network connection 120 between the at least two receiving stations 100 and the remote operation center 110. The present invention may additionally include at least one proxy server 130 that controls data flow between at least one receiving station 100 and the external network connection 120, and/or between the at least one external network connection 120 and the remote operation center 110.

The remote operation center 110 serves as the coordinator of the materials management system 10, and receives, interprets, correlates, and transmits data within the materials management system 10. The remote operation center 110 is preferably accessible from any communicative connection with the external network connection 120, using, but not limited to, a PC, PDA, or the like, having internet, extranet, or intranet access to the external network connection 120. The remote operation center 110 receives attributes associated with items, destinations, or other elements necessary for materials management, from other aspects of the materials management system 10, receives and/or generates updates to the attributes, and transmits attributes and updates to the at least two receiving stations 100 upon request from the at least two receiving station 100. An attribute is herein defined as an object or information item, such as a programmable object, associated with, or belonging to, a specific location, item, office, or person, and is, in particular, capable of at least assisting in the unique identification of that item with which that attribute is associated. Thus, attributes include pertinent information that allows, for example, for the categorization of an item, and that allows for the item to be uniquely identified for tracking purposes. Attributes include, but are not limited to, color, shape, size, addressee, status, a signatures record of what, when, and where parties signed for the item, present location of the item, desired delivery destination, contents, and/or weight, for example. In so assigning and identifying by attributes, the remote operation center 110 formulates a coordinated effort within the materials management system 10.

The remote operation center 110 coordinates the efforts at the local site between and among the at least two receiving stations 100, which receiving stations may include, for example, at least one destination site or station, at least one delivery method station, and/or at least one docking station. For example, in a coordinated system, items with similar destinations may be grouped together by the remote operation center 110 for placement onto the same truck, i.e. the same delivery station, for delivery to at least one of the at least one destination stations. Similar destinations may be grouped by the remote operation center 110 so that one truck, or a single conveyer line, for example, can efficiently service similar destination receiving stations, or similar products. In so doing, the materials management system 10 may take into account certain attributes, including but not limited to, the number of items, the weight of the items, and the types of items, for example.

For example, in an exemplary embodiment, it may be desirable that a given type of item, such as items having the attribute "perishable", may all be delivered using the same methodology, i.e. the same receiving station in the form of a delivery station, such as a refrigerated truck, within, for example, two hours of receipt at a receiving station 100. Perishable goods may include items that must be used within a certain time frame, to goods that must be stored within a predetermined time frame, which conditions are often not met by delivery methodologies of the prior art. In the present invention, for example, perishable is thus defined within the items attributes, thereby providing information to the remote operation center 110 to enable prioritization of the perishable items within a given delivery route. Other types of goods in this exemplary embodiment might require special tools for delivery, such as a forklift, and these special tools would additionally preferably be defined within the attributes of a given item. Items that require a forklift for delivery might be coordinated by the remote operation center 110, overriding other conditions, such coordination for delivery along a common route, such that all goods requiring a forklift for delivery are all delivered from the same truck having a forklift, thereby improving efficiency with respect to delivery requirements.

The remote operation center 110 may additionally provide for a copy link 140 with legacy, or other local, systems of a local site. For example, the copy link 140 may provide a direct link to real-time operations of the client. Using the copy link 140, client web browser page(s) or other methodologies employed to enter data prior to the installation of the materials management system 10, or to formulate commands for use in the materials management system 10, may be coupled to the materials management system 10 via the copy link 140. Thereby, a single user action may be employed to copy and paste information from the local site into the materials management system 10. For example, an operator may highlight relevant attributes within the legacy at the first receiving station 100 regarding a given received item. The operator may hit a "submit" button, for example, which may automatically copy all highlighted attribute information to the attribute record of that item at the remote operation center 110 using the copy link 140.

In addition to the remote operation center 110, the materials management system 10 also preferably includes at least one receiving station 100 serving as a localized control center. A receiving station 100 may, for example, be a remote scanner attached to an electronic device that can communicate with a device, that can store, retrieve and process data, or the receiving station 100 may be a PDA device having a modem enabled to communicate with a receiver that communicates with an electronic device that can store, retrieve, and process data, or the receiving station 100. Each receiving station 100 is preferably capable of receiving and transmitting tracking data to and from the remote operation center 110. The first receiving station 100 at the local site may be, for example, a loading dock at which all incoming items are received at the local site. The first receiving station 100 at the local site may communicate to the remote operation center 110 whether the received item has a pre-existing barcode, such as from the courier that delivered the item, and, if a pre-existing barcode is present, the attributes are preferably transmitted as being associated with the pre-existing barcode. If a pre-existing barcode is not present, the remote operation center 110 preferably generates a barcode tracking number, and sends this tracking number to the first receiving station 100 for printing onto a barcode attachment at the first receiving station 100 for placement onto the received item.

A final receiving station 100 may be, for example, a final delivery point, or may be a hand-off point, either to a carrier that will provide for final delivery, or to a third party. If the requestor of an item did not to wish to wait for an item to be delivered, but instead decided to pick up the item, the knowledge of the item whereabouts in the materials management system 10 could be jeopardized. In this instance, when the third-party comes to claim the item from within the materials management system 10, the item is scanned and manually entered as "claimed" from a given place at a given time by the third-party, thereby updating the status attribute of that item to "third party hand-off".

One or more receiving stations 100 in the present invention may be PDAs, rather than, for example, PCs. For example, wireless modems having radio transceivers therein may be mounted in warehouse ceilings in order to receive scanned information via radio communication from the PDA receiving station 100, such as within a plant or factory, and in order to forward the information received from the PDA receiving station 100 to the remote operation center 110.

Additionally, the materials management system 10 may thus include transmissions from a PDA receiving station 100 modem, such as packet transmissions via the PDA modem, or may include a batching of all information at the PDA for later download to the remote operation center 110. A packet is a message portion transmitted over a packet-switching network. The packet preferably contains the destination address in addition to data, thereby allowing messages to be divided into packets before sending, thus leading to improved data flow efficiencies and robustness. Batching techniques employed in the present invention may be based on a circuit-switching technology, in which a dedicated line is allocated for transmission between two parties. Circuit-switching is ideal when data must be transmitted quickly and must arrive in the same order in which it is sent. However, the batching of the instant invention may include a data line connection between the PDA and the remote operation center 110, such as by a docking of the PDA at a receiving station 100 having a connection to the remote operation center 110.

Transmission and reception of data from each receiving station 100 to the remote operation center 110 regarding received items may occur in real-time, or may occur upon docking of the receiving station 100 into a communications portal, such as the docking of a PDA at a docking station communicatively connected to the remote operation center 110, for example. Real-time communication between the at least one receiving station 100 and the remote operation center 110 may occur, for example, if the receiving station 100 is connected to the materials management system 10 substantially directly, such as by a direct connection through the external network 120. The receiving station 100 may collect the attributes, and may immediately send those attributes in real-time to the remote operation center 110 via the communicative connection with the external network 120. The collection of attributes at the receiving station 100 may be enhanced, for example, if the receiving station 100 includes an infrared scanner for scanning barcodes, thereby allowing for a scan of barcodes and an automated forwarding of the barcode data and associated attributes to the remote operation center 110. For example, the infrared scanner might scan a bar code on the item and thereby collect the item attributes, or attributes may be manually entered by an operator, such as for an automatically scanned barcode. Once the terminal associated with the scanner receives the attributes, the attributes may be distributed to the materials management system 10, such as by transferring to the remote operation center 110.

Alternatively, real-time communication may not be available, such as due to the environment, location, a network outage, or other event that prevents connection of the receiving station to the remote operation center 110. In such an instance, the attribute information may be batched and transferred subsequently. For example, the receiving station 100 may operate locally to batch the tracking data for transmission at a later time. This later time is preferably a time at which the conditions preventing transmission are no longer present. The batch may be downloaded upon allowance of transmission, such as by docking, as discussed hereinabove. For example, the receiving station 100 may be a handheld unit, such as a PDA, with no infrared or radiation transmission capability, and thus a direct electrical connection, such as docking, may be used to upload batched information.

In light of the fact that the remote operation center 110 may serve to house a database of data relating to the items within the materials management system 10 received at the receiving stations 100, a plurality of reports may be generated from the database, either by the remote control center, or by a communicative connection of the remote control center to a report generator, such as a report generator at a receiving station. Reports may be generated for any number of recorded variables in the tracking system, as discussed further hereinbelow with respect to FIG. 4. Report generation may be customizable based on client desires and needs, for any or all of the attributes tracked within the materials management system 10. For example, the quantity of items arriving at a given destination can be reported, and this report may additionally include the time at which the packages were delivered. Reports may be generated, for example, to isolate an error source in the distribution sequence. This may be accomplished by generating error reports based on delivery stations, and by ranking the stations according to the number of errors reported. Reports may be generated to isolate a particular type of delivery. For example, perishable deliveries may be reported, and timing information can be generated for time required to get the perishable item to the destination, or timing information can be generated illustrating the average delivery time for such perishables. In addition, the attribute record may provide reports regarding usage statistics for a route and/or a truck on a route, for example, thereby providing for modifications to improve efficiencies throughout the receipt and delivery process. Reports can be generated to provide specific information about computer deliveries, chemicals, or for any recorded variable for which the client desires a report. Recorded variables can be combined in reports to provide further information.

Reconciliation may be performed using the receiving stations 100 and the remote operation center 110 in order to ensure accuracy of delivery. Reconciliation, for example, may be performed at several points in the present invention, or may be performed solely upon delivery. Reconciliation is performed based upon the attributes transmitted to the remote operation center 110, or, for example, based upon the batched data held at the local station. For example, a truck loaded with items arrives at a first destination receiving station 100, and the first destination, the truck, and the item are scanned in a predetermined order. If the scanned item is properly on the truck, and is properly delivered to that scanned first destination, the item is removed from the truck by the operator, and the status of that item attribute is modified to "delivered" status, either within the remote operation center 110 database, or, if the receiving station 100 is unable to transmit the information at that time, within the batch. However, if delivery was improperly attempted at an incorrect destination, the receiving station 100 would alert the deliveror that the current destination is incorrect, thereby allowing the deliveror to return the item to the truck to be delivered correctly. Similarly, verification can be performed that all items destined for a certain destination, or on a certain delivery run, have been properly delivered, either by the PDA or reconciliation with the remote operation center 110, or locally on the receiving station 100 with batching to the remote operation center 110. For example, a batch of proper deliveries can be downloaded to the receiving station 100, and, as each delivery is made, the batched delivery information may be checked against the downloaded list.

The materials management system 10 may additionally include a proxy server 130 between the receiving station 100 and the external network 120, and/or between the remote operation center 10 and the external network 120. This proxy server 130 is an intermediate link that intercepts and/or manipulates requests to and from the remote operation center 110, rather than transmitting those requests directly to the remote operation center 110, such as for security purposes. Consequently, each receiving station 100 may need to grant access to the remote operation center 110 to that receiving station 100 via the proxy server 130 of the network to which that receiving station 100 is connected.

The system of FIG. 1 may additionally operate using known types of paper manifests, such as, for example, in instances wherein the item is delivered on short-runs, wherein a signature is required, or during periods of computer outages. When the system, or a portion thereof, is operated using paper manifests, several modes of operation may exist. For example, the manifest may have thereon, or may have entered into the system therefor, a bar code representing a programmed set of the attributes associated with the item or items in the manifest. This enables a receiving station 100 that has not previously downloaded, from the remote operation center 110, the information associated with an item, to operate similarly to a receiving station 100 that has received the information. For example, each manifest item may have multiple bar codes printed therefor. The manifest items may each have, thereon, a bar code which is scanned upon delivery to a receiving station, and the delivery manifest carried by the delivery operator may have placed thereon a second barcode label, thereby providing the receiving station 100 with a portion of the information relative to that or those manifest item(s), such as the delivery of those items to a final destination, merely by scanning the barcode from the manifest upon return of the manifest to the remote operations center, or to a terminal communicatively connected thereto. Additionally, if the manifest information, and the attributes associated with a particular scanned item, match, then the item may be initiated to the system, and the scanning process may be repeated for each scannable line item on the manifest received at the receiving station 100. Further, upon completion of the entry of each item to the system, the manifest may be scanned, or manually entered, thereby allowing the attributes for each item to be transmitted to the remote operation center 110, as discussed hereinabove. Moreover, the packing slip of the package may have an additional copy of the barcode placed thereon upon receipt of the package into the material flow system, thereby allowing for a package to be monitored at check-in, during flow, and upon delivery using three copies of the same bar code.

Alternatively, the manifest may have listed thereon all of the items contained on a truck, and the destination for each item. As items are delivered, the manifest can be checked, either manually or automatically, to verify the delivery. Upon completion of the deliveries, contact with the materials management system 10 may be established to allow for entry of the completed manifest into the materials management system 10, thereby allowing for reconciling, completion of the delivery cycle, and an updating of the materials management system 10 records.

The remote operation center 110 may provide additional features to the local receiving stations 100, such as operator alerts. For example, when scanning items within the materials management system 10, operators may not be located near the receiving station 100, such as an instance wherein a portion of the receiving station 100 is a desktop personal computer communicatively connected to a relatively remote infrared scanner, such as a radio hand-held scanner, operated by the operator. In such an instance, it is contemplated that the present invention include color and/or sound alerts that alert the operator of specific facts. For example, when an item is scanned, the screen of the PC to which the item is scanned may flash the color blue to alert the user that the information has been accepted and entered to the remote operation center 110. Alternatively, the screen may flash red to alert the operator that the item, scan, or entry is not acceptable, or must be manually overridden.

In an exemplary embodiment of the materials management system 110, an interface exists between the at least one receiving station 100 and the remote operations center 110, over an external network 120 and through a proxy server 130. The receiving station incorporates a scanner, such as for example, a handheld wireless scanner, such as an SPT 1733 Handheld Wireless Scanner, or a wired scanner, such as a Symbol SPT/F100, to allow for package, and package attribute, tracking. In this exemplary embodiment, material flow through the materials management system is initiated as an order with a supplier. The record of the order, including the attributes of the item, is entered into the system via a computer linked to the at least one receiving station 100, such as by making use of the copy link 140 to copy a supply order from the local computer to the remote operations center. Upon receipt of the ordered item at the at least one receiving station 100, a bar code label is associated at the remote operations center with the attributes of that item, and the bar code label is printed and affixed to the item. This barcode thus represents the attributes of that item in the materials management system 10. In addition, the attributes, namely receipt of the item at a first of the at least one receiving stations 100, are updated as updated attributes of the item.

Figure 2:
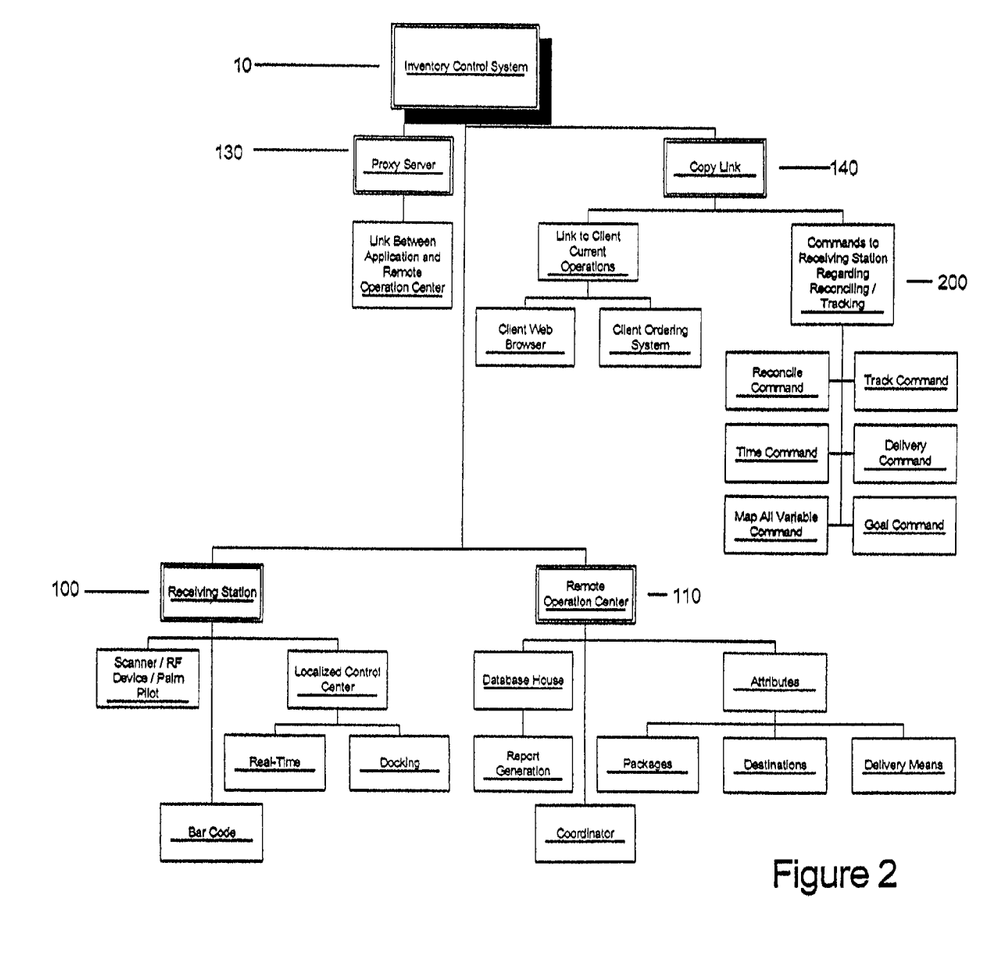
FIG. 2 is a block diagram illustrating, with more particularity, an embodiment of the system of FIG. 1.

With reference to the exemplary embodiment, after bar coding, the item may flow to the distribution area, whereat the item is scanned and designated for delivery in accordance with the item attributes. For example, delivery via a truck might entail scanning the bar coded item and the matching of a scan of a bar coded truck, as discussed hereinabove. The item, now reconciled to the proper delivery truck, might then be loaded onto that truck for delivery to the destination. Off-loading to a building might then be performed by scanning the bar coded item and then matching a scan of a bar coded building. The quantity of packages delivered to the building, and the number of items destined for that building, may be compared with the attributes of the items as stored at the remote operations center, as determined either by a continuous communication between the scanner and the remote operations center, or by a batch of information accessible to the scanner, to provide for a reconciliation to ensure accuracy in delivery FIG. 2 is a block diagram illustrating, with more particularity, an embodiment of the system of FIG. 1. The system of FIG. 2 illustrates the inclusion in the system of at least one receiving station 100, the remote operation center 110, and at least one copy link 140. FIG. 2 additionally illustrates that the copy link 140 of the present invention may provide the capability to generate commands for reconciliation and/or tracking 200 at the copy link 140 station, and to download those commands 200 to the remote operation center 110 via the receiving station 100.

Figure 3:
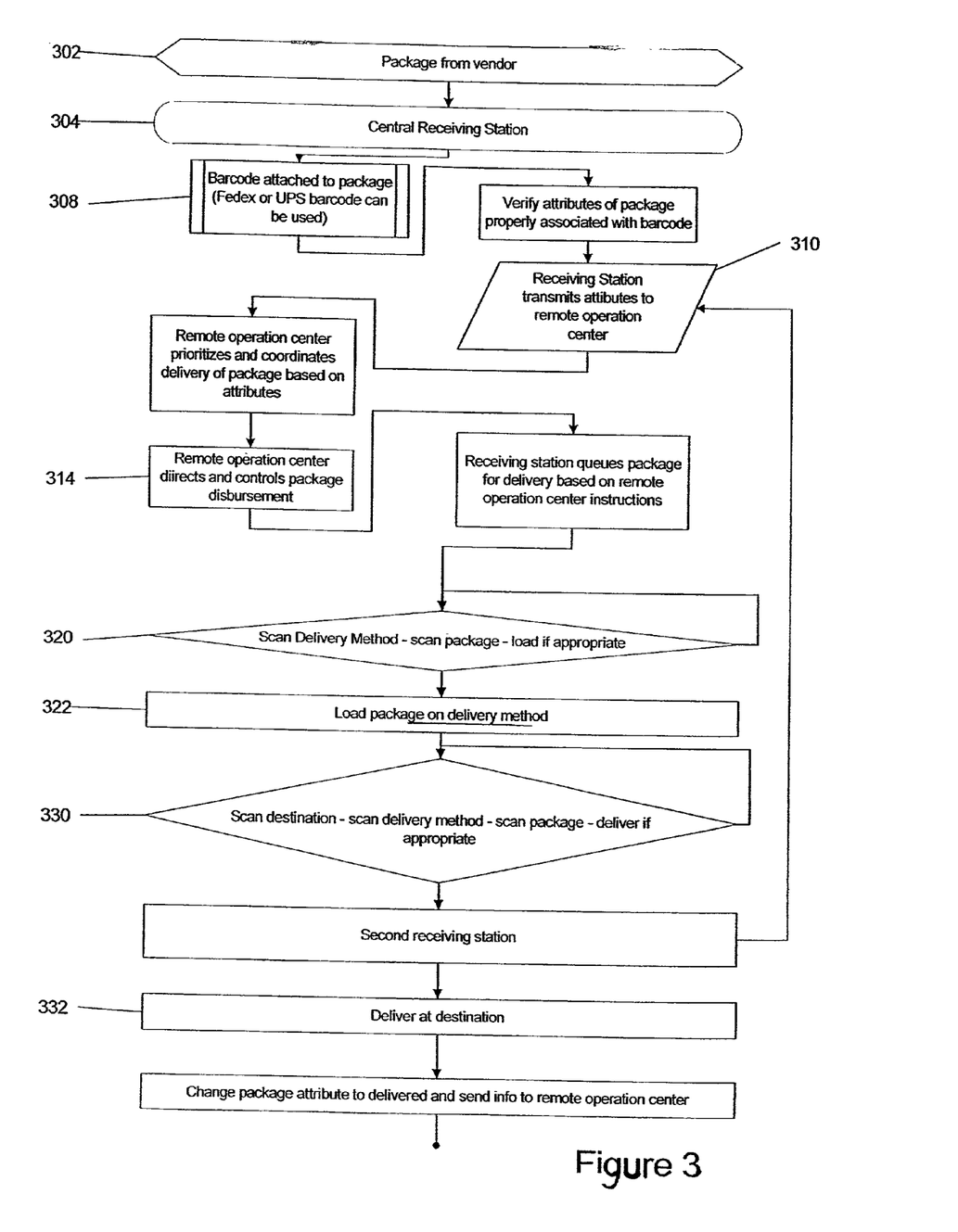
FIG. 3 is a flow diagram illustrating an exemplary flow of the tracking system of the present invention.

FIG. 3 is a flow diagram illustrating an exemplary flow of the tracking system of the present invention. The method of FIG. 3 may include the steps of receipt of an item from a vendor 302 at a central receiving station 304, attaching a barcode or entering a preexisting barcode to the system 308, the transmission of attributes associated with the barcode to the remote operation center 310, receipt of remote operation center instructions for item delivery in accordance with the attributes 314, scanning the delivery methodology 320, loading the item for delivery 322, scanning a destination, and delivering if appropriate 330, and delivering to a scanned destination 332.

In operation, an item typically arrives from a vendor, such as via a mail carrier, package carrier, courier, or the like, at a central receiving station. Items received at the receiving station 100 may or may not already have a barcode placed thereon by the sender, carrier, or courier. Upon receipt in the central receiving area, an item without a barcode thereon may preferably have generated a barcode, which barcode is attached thereto. The barcode, whether already present on the item, or placed thereon at the receiving station 100, may be associated within the system 10 with basic attributes of that item, such as sender, size, or the like, such that scanning of the barcode will reference the necessary attributes of the item within the materials management system 10. Thus, the present materials management system 10 may generate barcodes at the receiving station 100, which barcodes are associated with attributes, or may employ barcodes of common deliverers, such as UPS® or FedEx®, for association with attributes. The entry of attributes associated with the item via the barcode may be verified by the operator following entry, either manually or automatically. For example, the barcode may be scanned, and the attributes of the item may be displayed at the receiving station 100 in response to the scanning, for review by an operator, or for automated comparison, such as between an actual weight and an attributed weight. Further, an operator providing verification may additionally be provided a capability to enter additional information not appearing in the attribute record.

Upon verification of the attributes for the item, the data record is sent from the receiving station 100 to a remote operation center 110. The remote operation center 110 prioritizes and coordinates delivery of the item, based on the attributes of the item and the master prioritization of the materials management system 10. For example, perishable goods may receive maximum priority within the design of the materials management system 10. The remote operation center 110 controls disbursement and/or flow of the item by updating and/or modifying the attributes to reflect desired flow and delivery mechanisms, timing, and conditions, such as the conveyer upon which the item must pass to reach a particular truck that delivers that specific item type, or that delivers to that particular assigned end-destination at a given time. Upon receipt of a command from the remote operation center 10, the receiving station 100 may queue the item for delivery using these modified attributes as a guide. Throughout the process flow, instructions from the remote operation center 110 are associated with the item as updated or modified attributes. As delivery methods are performed in accordance with the attributes, the delivery methodology and location may be scanned, as well as the delivered item. For example, the scanning of a bar code on a truck that is to complete delivery of an item, followed by the scan of an item taken off that truck, may be performed to thereby inform the system that the truck was the selected delivery method for that item, and that the truck is attempting to complete delivery. If the remote operation center 110 has designated this delivery method for that item, the item may be properly loaded onto this delivery method.

Upon verification of the delivery method, either using confirmation from the remote operation center 110 of the selected delivery methodology, or by a manual override, for example, the associated delivery method may perform the delivery process. As delivery is performed, each end destination may be scanned, in addition to the scanning of, for example, the delivery methodology and the item delivered. Upon scanning of the destination for this item, the item, and the delivery methodology, the remote operation center 110 will select whether this item is properly delivered by this methodology to this destination at this time, and the operator may be informed of this reconciliation, such as by a hand-held unit, either in communication with the remote operation center 110, or by batched information stored on the hand-held device during a prior docking communication of the hand-held with the remote operation center 110. Reconciliation may be used to ensure that the then-present destination is not departed by the operator without delivering a particular item, or after having mis-delivered a particular item. A particular destination so scanned and/or reconciled may be the final destination for the item, or may be, for example, a secondary receiving station 100. If the particular destination is a secondary receiving station 100, the process discussed hereinabove may be repeated. Once an item reaches its ultimate destination, the attributes of that item would preferably be modified to reflect a "delivered" status, and this modified status would be updated throughout the materials management system 10, including at the remote operation center 110.

The present invention tracks and reconciles package inventory over the internet, or over any external network 120, at the remote operation center 110. Consequently, monitoring and control of inventory and process flow are made available in the present invention from any access point to the external network 120. For example, tracking is performed at a local station, is recorded, monitored, and modifiable at the remote operation center 110, and the remote operation center 110 is accessible and modifiable in its control of the local station by external network 120 access to the remote operation center 110. In this manner, process controllers can control and monitor process flow from any point at which access to the external network 120 is available, such as from a business travel location, or from the home of the process controller.

FIGS. 4*a* through 4*h* illustrate an exemplary user interface that may operate in conjunction with the method and system of the present invention.

Figure 4A:
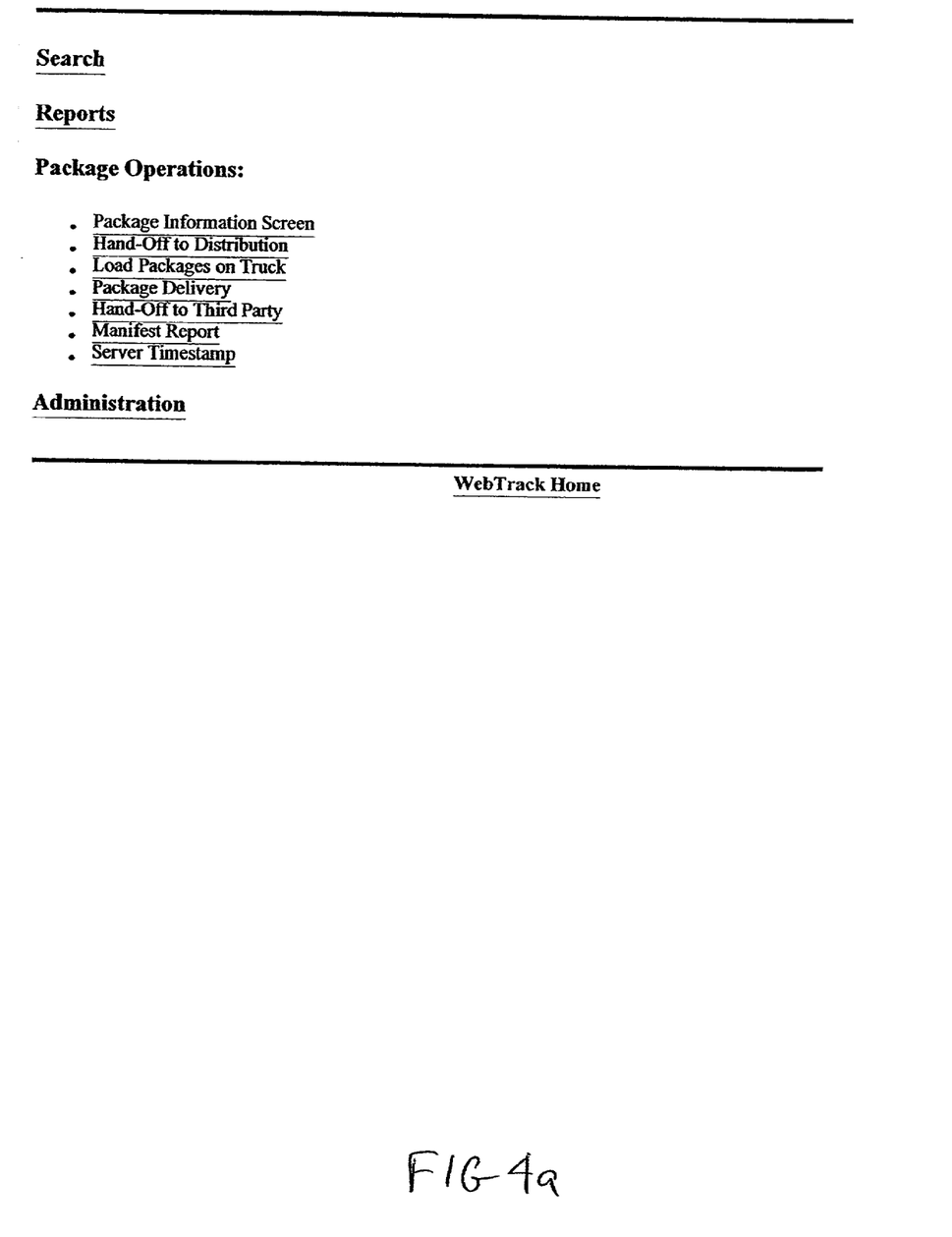
FIG. 4a illustrates the front page of an exemplary tracking system in accordance with the present invention.
Figure 4B:
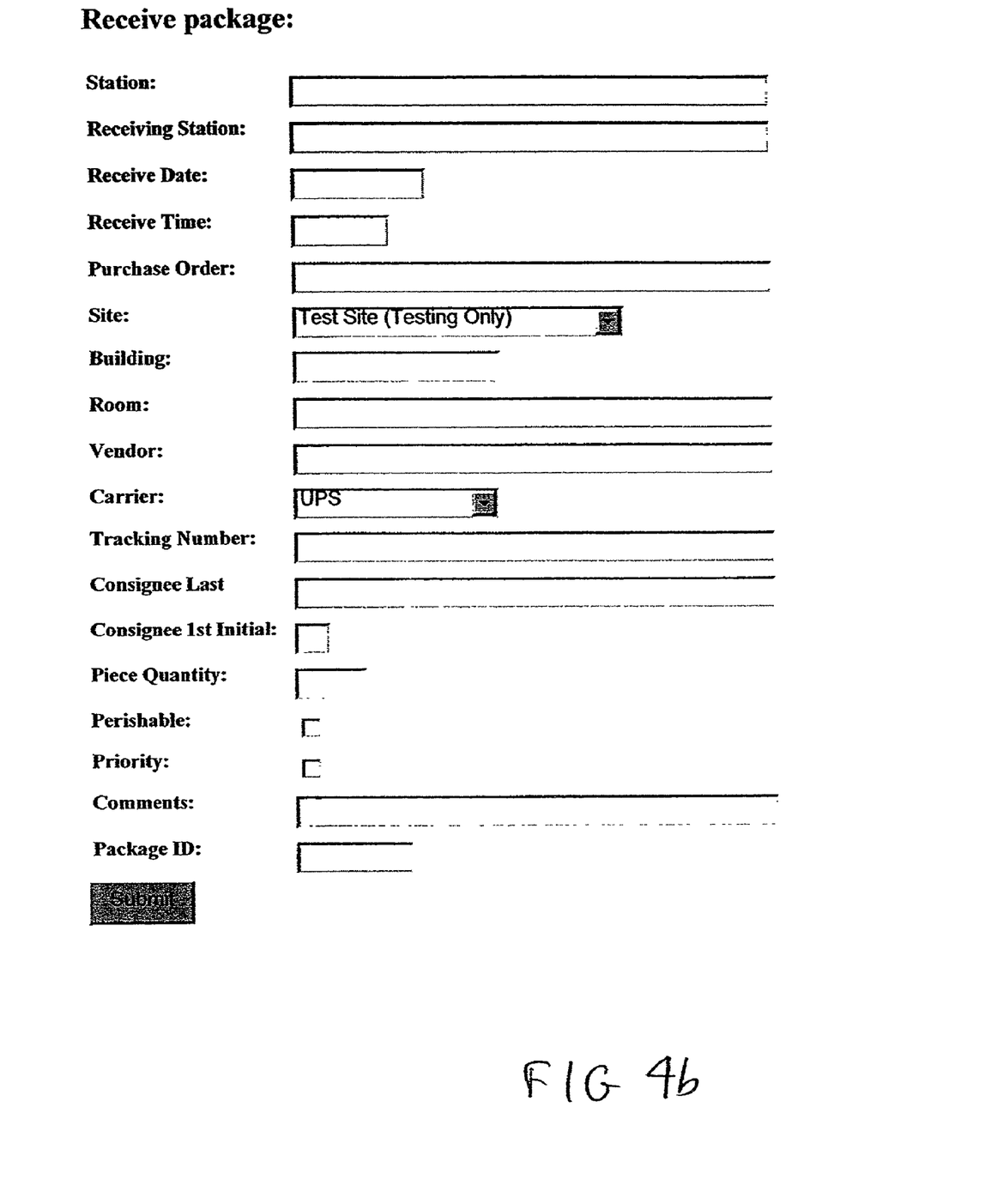
FIG. 4b illustrates an exemplary interface for a received item record in accordance with the present invention.

FIG. 4*a* illustrates the front page of a tracking system in accordance with the present invention, which front page is accessible via a network interface. In one embodiment of present invention, the screen illustrated in FIG. 4*a* may be one portion of a split screen representing the remote operation center 110, wherein a second portion of the split screen may be a display of data items within the local, and/or legacy, system at the receiving station 100. By this methodology, information in the local portion of the split screen may preferably be highlighted, or otherwise copied, such as by an operator or an automated information seeker, for pasting into the portion of the screen illustrating the remote operation center 110 for the tracking system. This information may be copied from the local portion to the remote portion simply by hitting, for example, a "submit" button.

The front page of the remote operation tracking system accessible over the network preferably includes options for the user to select from. In an exemplary embodiment, these options may include, for example, information on a particular item, hand-off options for a particular item either to distribution or a third party, loading options for an item, delivery options for an item, and/or reporting options for an item. Also included, may be, for example, search options, or administration options, for either the local system or the remote system of the present invention.

For example, within the local system, an item may be earmarked as received, or not received, and may include a tracking number, or may not include a tracking number. If the item has been received, the item information will be accessible via a received item record, such as that illustrated in FIG. 4*b*. The received item, in an embodiment wherein the received item does not have a pre-assigned bar code, may have a bar code generated for it from the remote operation center 110, and this bar code may be sent to, and printed at, the local station, for placement onto the item. Upon receipt of the bar code, the item may be tracked using the information illustrated in FIG. 4*b*. For example, the attributes of the item preferably include the tracking number, which may be the bar code number, the station at which the item was received, the date and time of receipt, a purchase order number, if available, a delivery site, which might include a building and room, a vendor, or sender, a carrier, if applicable, and other attributes unique to the received item. In an embodiment of the present invention, this information is accessible only to persons that log in to system, such as with an acceptable username or password. In another embodiment, portions of the information may be made available without such restricted access.

Figure 4C:
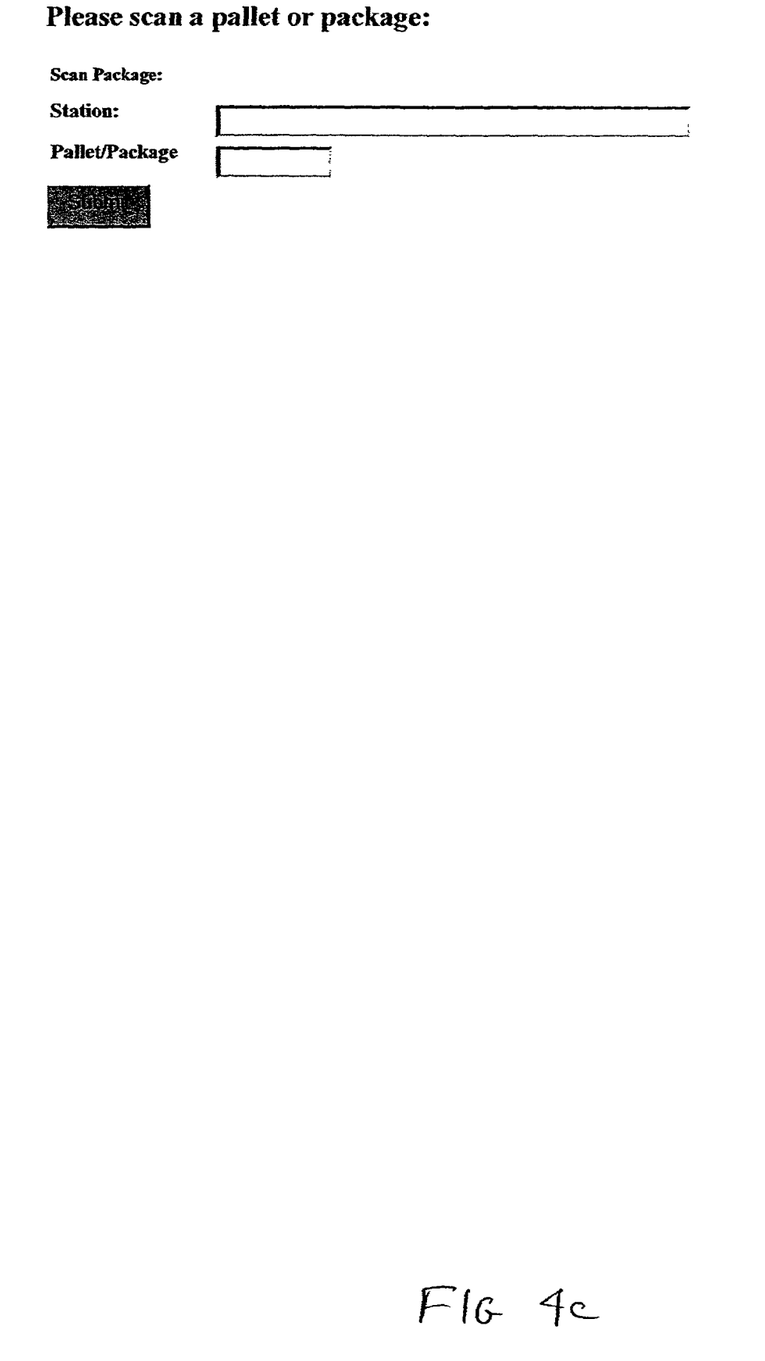
FIG. 4c illustrates an exemplary embodiment wherein an item may be scanned, in accordance with the present invention.

Upon display of the item information, an operator at the local station may have an option to enter any information, or attributes, not then-present in the information available from the remote operation center 110. In an embodiment wherein a bar code has already been assigned, either by the deliverer or by the remote station, the item may be scanned as illustrated in FIG. 4*c*. A scan screen similar to that in FIG. 4*c* may be employed at each receiving station 100 point in the materials management system process, to provide the capability to scan the item, and check attributes, at each point in the materials management system. Further, as illustrated in FIG. 4*a*, hand-off is available upon scanning at the receiving station 100, such as to the internal distribution operation center of the receiver of the item, or to a third party, such as a common carrier, as discussed hereinabove. In a preferred embodiment, the item is scanned at the station at which hand-off occurs, thereby entering into the remote operation center 110 the information that the item has been handed-off.

The search option, such as that illustrated in FIG. 4*a*, allows the item to be searched for using any unique attribute, at any point during operation of the tracking system. For example, if an item has been scanned as handed-off to the distribution operation center, a search for that item by tracking number will generate a status such as "in distribution". Further, the most recent station at which that item has been scanned will be available via the search option. Once the item, and its location, are generated using the search option, the movement of an item can be effected pursuant to entry into the item attributes by an operator of movement information specifying the different location, or station, for that item.

Figure 4D:
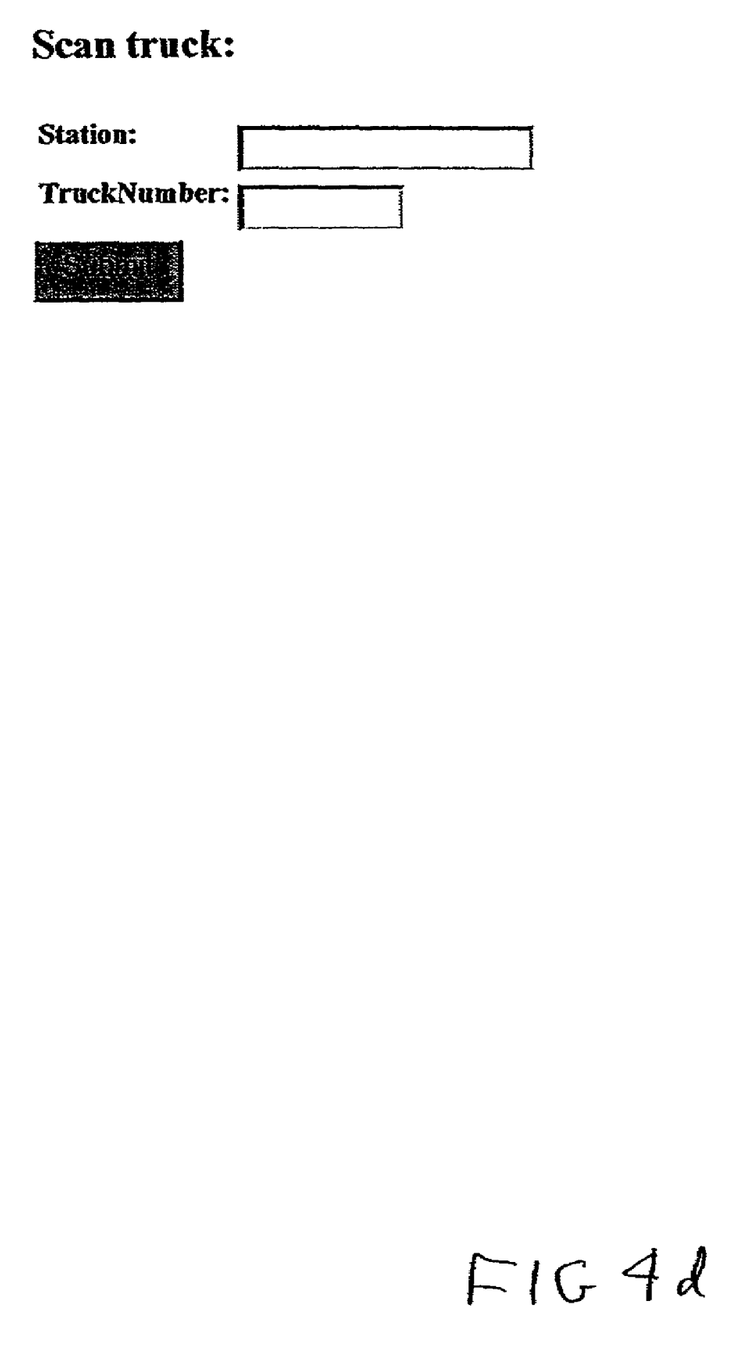
FIG. 4d illustrates an exemplary embodiment wherein the truck may be scanned or hard coded into the system fields, in accordance with the present invention.

As illustrated in FIG. 4*a*, a "load to truck" option may be available as a delivery option for an item in the tracking system. It will be apparent to those skilled in the art that numerous other delivery options may additionally be available, such as via train, forklift, airplane, or other delivery methods apparent to those skilled in the art. If an item is to be loaded to the truck, the truck may be scanned, as illustrated in FIG. 4*d*, or information concerning the delivery vehicle may be hard coded into the system fields. The truck onto which the item was loaded, the station at which the item was loaded onto the truck, and a date and time stamp for loading onto the truck, are preferably recorded into the attributes of the given item as illustrated.

Figure 4E:
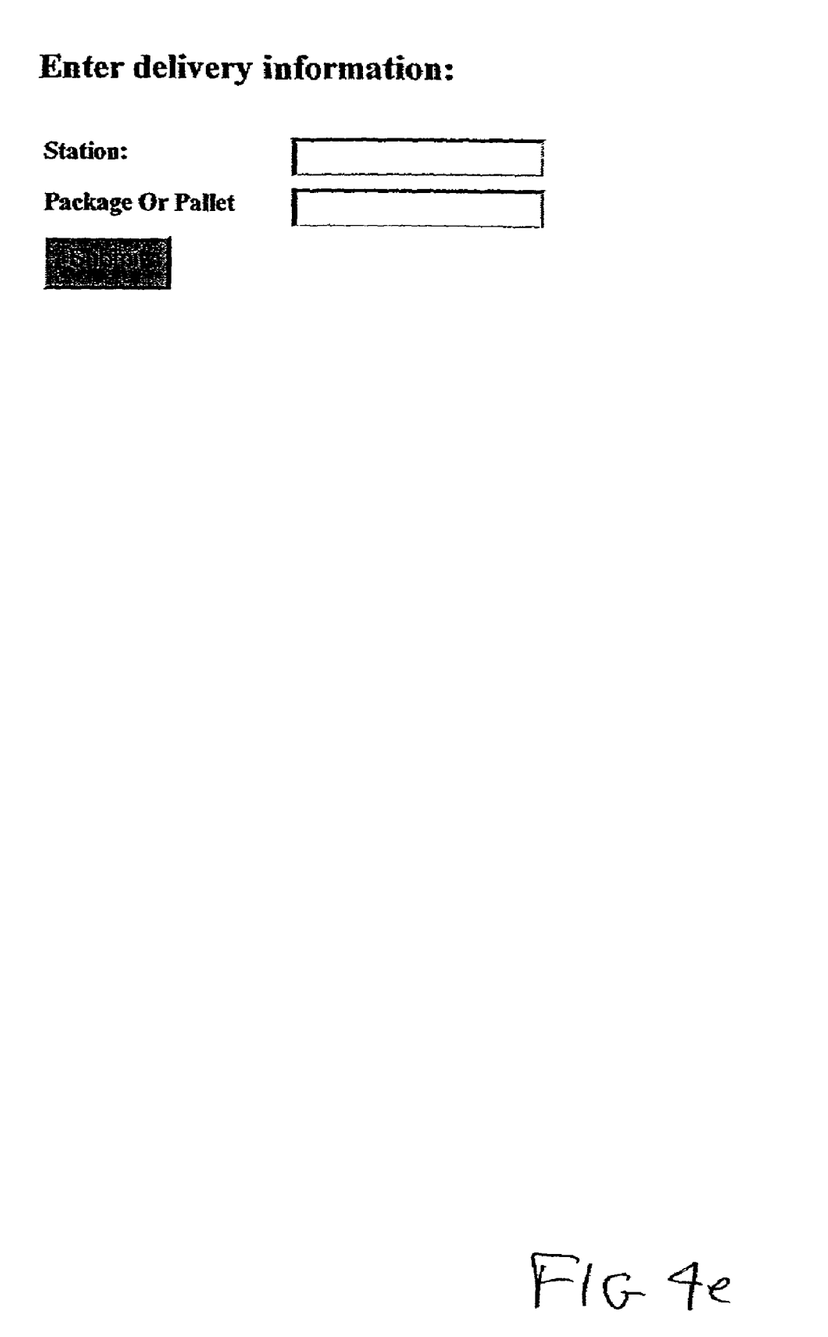
FIG. 4e illustrates an exemplary embodiment for entering delivery information, in accordance with the present invention.

Upon delivery of the item, a "package delivery" option may be selectable from FIG. 4*a*. Selection of this option allows for confirmation that the item has been received, and submitted into the system at the station at which the item was received. For example, delivery information may be entered into a screen as illustrated in FIG. 4*e*. Information may be entered to FIG. 4*e* by a scan of the item at the delivery location, or by manual entry using at least one attribute of the item, such as the bar code number. In accordance with FIG. 4, information on an item is available via the item attributes at each point in the delivery process, and it will be apparent to those skilled in the art that any number of stations may be present along the delivery process. For example, numerous automated scan stations may be available within a plant, for example, and each scan station may scan the bar code of the item, and thereby update the item attributes within the tracking system. Thus, the present invention allows for an updating and tracking of item attributes throughout all steps of a materials management process, rather than simply at the beginning of the process and at the end of the process as is known in the prior art.

Figure 4F:
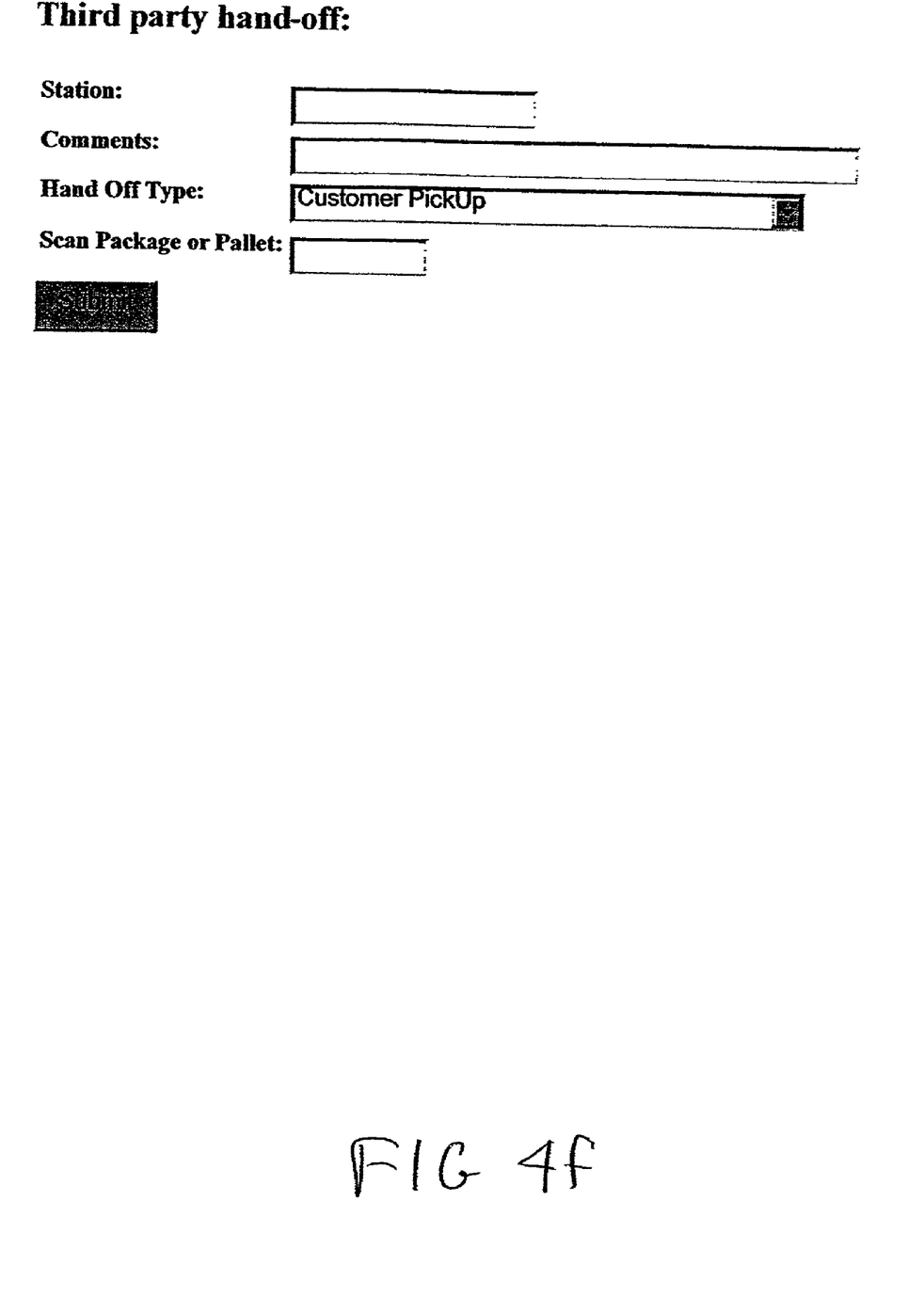
FIG. 4*f* illustrates an exemplary item "searches" for generating attributes, in accordance with the present invention.
Figure 4G:
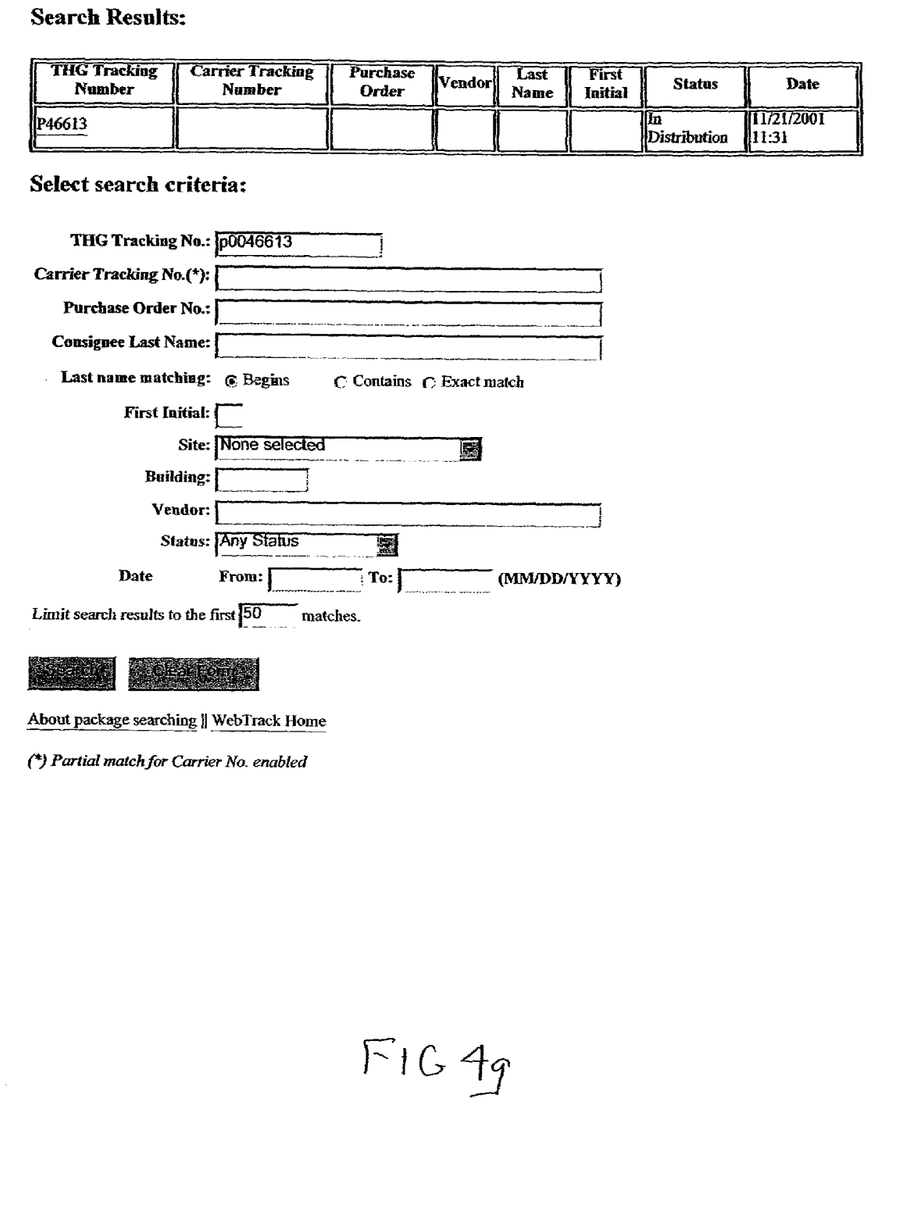
FIG. 4*g* illustrates an exemplary embodiment for updating attributes of an item as each station in the system is passed.
Figure 4H:
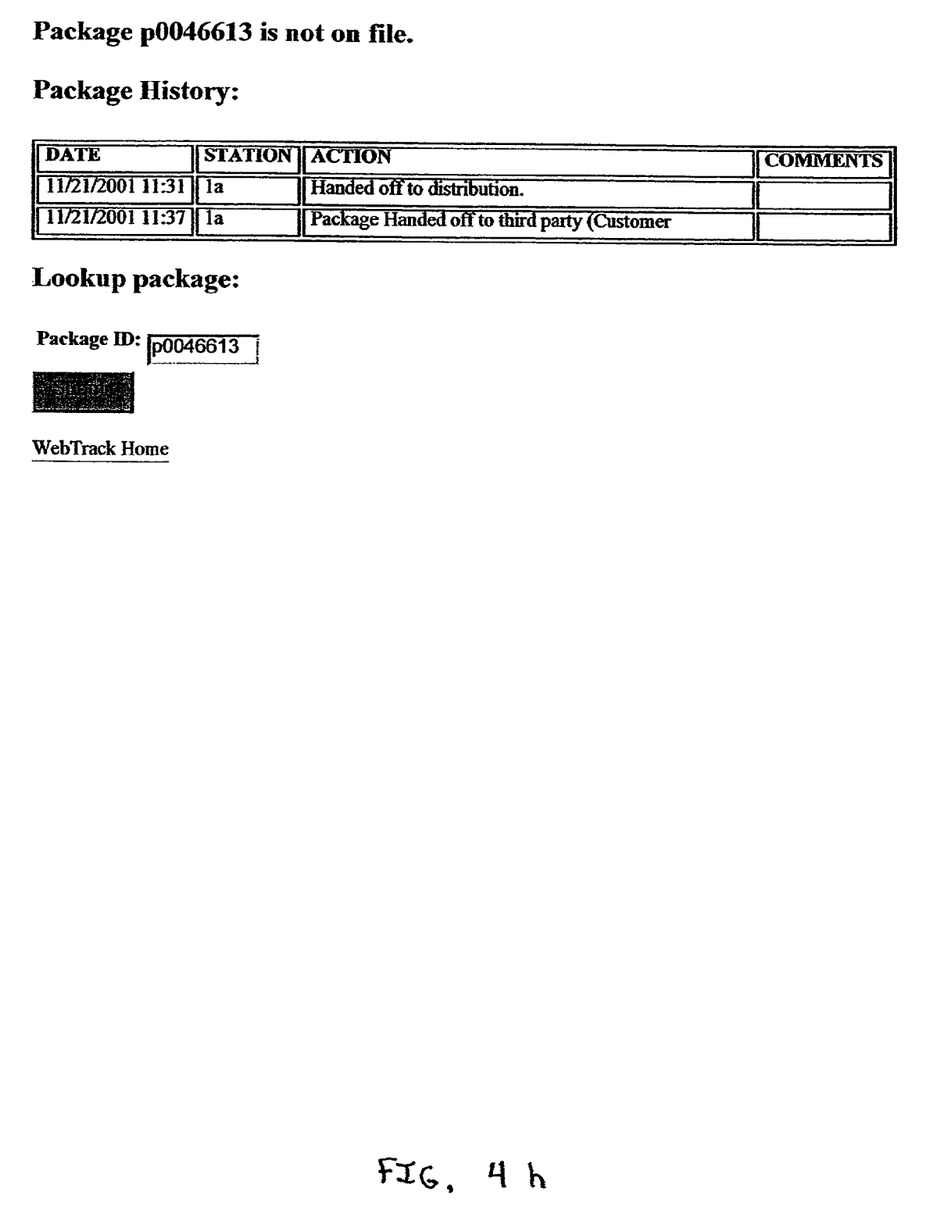
FIG. 4*h* illustrates another exemplary embodiment for updating attributes of an item as each station in the system is passed.

FIGS. 4*f* and 4*g* illustrate exemplary item "searches", wherein a single unique attribute of the item has been entered, and the attributes of the item are generated therefrom. FIGS. 4*g* and 4*h* illustrate that the attributes of an item are updated as each station in the system is passed, and as each action is taken on the item throughout the system.

Further, as illustrated in FIG. 4a, reports are available using the present invention. For example, a manifest report may be available for use by the operator of a delivery vehicle. The manifest report, may be, for example, keyed by bar codes of the items placed on the truck. Thus, upon delivery of each item on the truck, the bar code of the item can be checked against the manifest, and, upon completion of the delivery of all items on the truck, the manifest report will have zero number of items remaining for delivery. Thereby, the manifest report may be manually updated, or may be automatically updated by matching the delivered items at a handheld device, or by communicating from a handheld device with the remote operation center 110 via, for example, a wireless modem, or a docking station. Additional reports may be available, such as reports on number of deliveries to a particular delivery point, such as a building, or address, or reports on particular runs, such as the types of items on a delivery run, or the division of items on different delivery runs, or different delivery methodologies, such as by delivery truck, or forklift. Reports are preferably customizable, and may be customizable over the network interface with the remote operation center 110.

Those of ordinary skill in the art will recognize that many modifications and variations of the present invention may be implemented. The foregoing description and the following claims are intended to cover all such modifications and variations.

I claim:

1. A method of controlling a materials management flow including at least one inventoried item moving through at least two distinct geographic locations, comprising:

scanning the at least one inventoried item upon entry into the materials management flow at a first local receiving station and scanning an identification of the first local receiving station, said first local receiving station located at a first of the distinct geographic locations;

scanning the at least one inventoried item upon exit from the first local receiving station;

scanning the at least one inventoried item at at least one secondary receiving station upon delivery of the item to the at least one secondary receiving station, and scanning the identification of the at least one secondary receiving station, said at least one secondary receiving station located at a second geographic location distinct from the first geographic location;

scanning the at least one inventory item upon exit from the at least one secondary receiving station;

scanning the at least one inventoried item at at least one tertiary receiving station upon final delivery of the item to the at least one tertiary receiving station, said at least one tertiary receiving station located at a third geographic location distinct from the first and the second geographic locations;

scanning the identification of the at least one tertiary receiving station upon said final delivery of the item; and transmitting, entering, checking, and verifying the item's placement at at least one of the at least one secondary receiving station, and the at least one tertiary receiving station, by reconciling the identifications of each of the first local, the at least one secondary, and the at least one tertiary receiving stations and the at least one inventoried item with the materials management flow of record at a remote operation center externally connected to the first local receiving station, the at least one secondary receiving station, and the at least one tertiary receiving station.

2. A method of controlling a material flow, comprising:

coordinating material flow at a remote operation center;

externally transmitting at least one attribute to the remote operation center from at least one receiving station;

receiving the at least one attribute of at least one material flow item in the material flow at the remote operation center;

updating the at least one attribute at the remote operation center after said receiving;

externally transmitting the at least one updated attribute from the remote operation center to the at least one receiving station;

gathering the at least one material flow item from one other of the at least one receiving stations, after the at least one material flow item has had the at least one attribute externally transmitted from at least two of the at least one receiving stations, by a provider of delivery services; and transmitting, entering, checking, and verifying the at least one updated attribute at the one other of the at least one receiving stations by scanning an identification of each of the at least one receiving stations, the at least one material flow item, and the provider of delivery services, and by reconciling the scanned identifications of each of the at least one receiving stations and the at least one material flow item with the material flow of record.

3. The method of claim 2, further comprising displaying the at least one updated attribute at the remote operation center, and at the at least one receiving station.

4. The method of claim 2, wherein said coordinating comprises receiving at least one system operator command from the at least one receiving station, wherein the system operator command is entered at the at least one receiving station by a system operator.

* * * * *